(12) United States Patent
Kalliske et al.

(10) Patent No.: US 9,994,191 B2
(45) Date of Patent: Jun. 12, 2018

(54) GAS BAG ARRANGEMENT FOR A MOTOR VEHICLE

(75) Inventors: Ingo Kalliske, Potsdam (DE); Dieter Markfort, Berlin (DE); Walter Kisler, Berlin (DE); Tobias Pausch, Berlin (DE); Norman Steinke, Berlin (DE)

(73) Assignee: TAKATA AG (DE)

( * ) Notice: Subject to any disclaimer, the term of this patent is extended or adjusted under 35 U.S.C. 154(b) by 655 days.

(21) Appl. No.: 13/981,764

(22) PCT Filed: Jan. 26, 2012

(86) PCT No.: PCT/EP2012/051188
§ 371 (c)(1),
(2), (4) Date: Oct. 14, 2013

(87) PCT Pub. No.: WO2012/101196
PCT Pub. Date: Aug. 2, 2012

(65) Prior Publication Data
US 2014/0027195 A1    Jan. 30, 2014

(30) Foreign Application Priority Data

Jan. 27, 2011 (DE) .................... 10 2011 010 263
Aug. 31, 2011 (DE) .................... 10 2011 081 889
(Continued)

(51) Int. Cl.
*B60R 21/36* (2011.01)
*B60R 21/34* (2011.01)
(Continued)

(52) U.S. Cl.
CPC .............. *B60R 21/36* (2013.01); *B60R 21/34* (2013.01); *B60R 21/2176* (2013.01);
(Continued)

(58) Field of Classification Search
CPC .......... B60R 21/38; B60R 21/36; B60R 21/34; B60R 2021/165
(Continued)

(56) References Cited

U.S. PATENT DOCUMENTS 6,131,949 A    10/2000  Lewis et al. .................. 280/739
7,681,914 B2    3/2010  Maidel et al. ................ 280/739
(Continued)

FOREIGN PATENT DOCUMENTS

CN         1931638 A      3/2007
CN       101341049 A      1/2009
(Continued)

OTHER PUBLICATIONS

Japanese examination report dated Oct. 21, 2014.
CN Office Action, dated Mar. 18, 2015.
Office Action Translation, dated: May 14, 2015.

*Primary Examiner* — Keith Frisby
(74) *Attorney, Agent, or Firm* — L.C. Begin & Associates, PLLC (57) ABSTRACT

A gas bag arrangement for a motor vehicle is provided. The gas bag arrangement contains a gas bag which can be deployed for the protection of a person present outside the motor vehicle along at least a section of the outside of the windshield or another portion of an outside of the motor vehicle, at least one pressure reducing device for reducing the internal pressure at least of a partial region of the at least partly inflated gas bag, and a means for moving at least a section of the at least partly inflated gas bag out of the field of view of a vehicle occupant of the vehicle.

2 Claims, 10 Drawing Sheets

(30) Foreign Application Priority Data

Oct. 27, 2011 (DE) .................. 10 2011 085 330
Nov. 25, 2011 (DE) .................. 20 2011 052 110 U (51) Int. Cl.
- B60R 21/16 (2006.01)
- B60R 21/217 (2011.01)
- B60R 21/00 (2006.01)
- B60R 21/2338 (2011.01)
- B60R 21/239 (2006.01)

(52) U.S. Cl.
CPC . *B60R 2021/0027* (2013.01); *B60R 2021/165* (2013.01); *B60R 2021/2395* (2013.01); *B60R 2021/23388* (2013.01)

(58) Field of Classification Search
USPC .................................. 180/274, 271
See application file for complete search history.

(56) References Cited

U.S. PATENT DOCUMENTS

| | | | |
|---|---|---|---|
| 7,690,680 B2 | 4/2010 | Meissner et al. | 280/736 |
| 2002/0074775 A1 | 6/2002 | Ryan | 280/728.2 |
| 2003/0178239 A1 | 9/2003 | Takimoto | 180/274 |
| 2005/0218632 A1* | 10/2005 | Cuevas et al. | 280/730.1 |
| 2005/0257979 A1 | 11/2005 | Hamada et al. | 180/274 |
| 2007/0040366 A1 | 2/2007 | Maidel et al. | 280/739 |
| 2009/0066069 A1 | 3/2009 | Takahashi et al. | 280/743.1 |
| 2009/0066067 A1 | 6/2009 | Meissner et al. | 280/735 |
| 2009/0200778 A1 | 8/2009 | Ishikawa et al. | 280/739 |
| 2010/0307854 A1 | 12/2010 | Mildner | 180/271 |

FOREIGN PATENT DOCUMENTS

| | | | |
|---|---|---|---|
| CN | 101374699 A | 2/2009 | |
| CN | 101754889 A | 6/2010 | |
| DE | 101 38 449 A1 | 2/2003 | ............ B60R 21/34 |
| DE | 10138449 * | 2/2003 | |
| EP | 0 967 128 A2 | 6/1999 | ............ B60R 21/34 |
| EP | 1 992 526 A2 | 1/2008 | ............ B60R 21/16 |
| JP | 08276816 A | 10/1996 | ............ B60R 21/34 |
| JP | 2004-168111 | 6/2004 | |
| JP | 2004175154 A | 6/2004 | ............ B60R 21/00 |
| JP | 2004299517 A | 10/2004 | ............ B60R 21/00 |
| JP | 2005-297725 | 10/2005 | |
| JP | 2006-044322 | 2/2006 | |
| JP | 2009023600 | 2/2009 | |
| JP | 2010-076655 | 4/2010 | |
| WO | WO/2006/122535 A1 | 11/2006 | |
| WO | 2011156448 | 12/2011 | |

* cited by examiner

GAS BAG ARRANGEMENT FOR A MOTOR VEHICLE

CROSS-REFERENCE TO A RELATED APPLICATION

This application is a National Phase Patent Application of International Patent Application Number PCT/EP2012/051188, filed on Jan. 26, 2012, which claims priority of German Patent Application Number 10 2011 010 263.9, filed on Jan. 27, 2011, of German Patent Application Number 10 2011 081 889.8, filed on Aug. 31, 2011, of German Patent Application Number 10 2011 085 330.8, filed on Oct. 27, 2011 and of German Utility Model Application Number 20 2011 052 110.9, filed on Nov. 25, 2011.

BACKGROUND

This invention relates to a gas bag arrangement for a motor vehicle.

Gas bag arrangements for the protection of persons present outside the vehicle are known from the prior art. For example, DE 101 38 449 A1 describes such gas bag. One difficulty in such gas bag arrangements consists in removing the gas bag from the field of view of a vehicle occupant (in particular the driver) after an activation (e.g. also after an erroneous activation).

SUMMARY

The problem underlying the present invention therefore consists in creating a gas bag arrangement for the protection of a person present outside the vehicle, whose gas bag is movable out of the field of view of a vehicle occupant as quickly and completely as possible.

According to an exemplary embodiment of the invention, there is provided a gas bag arrangement for a motor vehicle, comprising a gas bag which can be deployed for the protection of a person present outside the vehicle along at least a section of the outside of the windshield or another portion of an outside of the motor vehicle; and at least one pressure reducing device for reducing the internal pressure at least of a section of the at least partly inflated gas bag.

By means of the pressure reducing device the gas bag internal pressure can be lowered after inflating the gas bag, whereby the retraction of the gas bag (e.g. towards its starting position), i.e. the removal of the gas bag from the field of view of a vehicle occupant, is facilitated and in particular accelerated. In addition, a means for moving the gas bag out of the field of view (retracting means), which will be described further below, need not work against the comparatively high internal pressure of the inflated gas bag, so that the retraction force required for retracting the gas bag is reduced, which can provide certain advantages in the design (e.g. the dimensioning) of components of the retracting means; for example, a more compact design of the retracting means is possible.

The pressure reducing device for example can be activated via a control means (in particular in the form of an electronic control unit—ECU) of the vehicle at a specifiable point in time (e.g. at the end of a specifiable time period after the start of the inflation of the gas bag or at a specifiable point in time which has been determined in dependence on other crash-relevant parameters). In particular, an electric control signal of the control means will be supplied to the pressure reducing device at the end of a specifiable time period after the start of the inflation of the gas bag, which signal will activate the pressure reducing device, i.e. after receipt of the control signal the pressure reducing device will start to reduce the gas bag internal pressure.

It is conceivable that the pressure reducing device comprises at least one outflow opening provided in the gas bag as well as a covering device, which at least partly closes the outflow opening before activating the pressure reducing device and at least partly clears the same (i.e. at least closes the same less) after activating the pressure reducing device. For example, the covering device comprises an actuator, for example in the form of a strap which at least covers the outflow opening before activation of the pressure reducing device and which after activation of the pressure reducing device moves relative to the outflow opening such that it covers the outflow opening less or clears the same completely. Possible variants of such a controllable outflow opening are described in the German Patent Application DE 10 2005 039 418, to which reference in so far is made herewith expressly.

According to another exemplary embodiment of the invention, the covering device includes at least one inflatable element which cooperates with the gas bag such that it at least partly closes the outflow opening before activating the pressure reducing device and closes the same less or clears the same completely after activating the pressure reducing device.

For example, the inflatable element is releasably connected with the gas bag (e.g. via a tear seam) in the region of the outflow opening. It is conceivable that the pressure reducing device comprises a gas providing means which upon activation of the pressure reducing device inflates the inflatable element such that it is detached from the gas bag and clears the outflow opening. The gas providing means in particular is a gas generator (e.g. a pyrotechnical gas generator) different from a gas generator, which serves for inflating the (protective) gas bag. It is conceivable that the inflatable element extends along an outside of the gas bag. This is, however, not absolutely necessary; rather, the inflatable element also can at least partly be arranged in the interior of the gas bag.

According to another exemplary variant of the invention, the pressure reducing device includes a coolant providing means for producing or introducing a coolant into the at least partly inflated gas bag. For example, the coolant is injected into the gas bag. By introducing the coolant into the gas bag or by producing the coolant by a means arranged in the gas bag, the gas present in the gas bag cools down (in particular abruptly), whereby the gas bag internal pressure is lowered. A suitable means for introducing a coolant into the gas bag is described in the German Patent Application DE 10 2006 010 953, to which reference in so far is made herewith expressly.

According to a further exemplary aspect of the invention the pressure reducing device includes an outflow opening generating means, which upon activation of the pressure reducing device acts on the gas bag thermally and/or mechanically and generates an outflow opening in the gas bag. For example, the outflow opening generating means comprises a tool (e.g. a blade or another suitable element) which after activation of the pressure reducing device (for example via an actuator cooperating with the tool) is brought in mechanical contact with the gas bag (i.e. with the gas bag envelope which defines an inflatable chamber of the gas bag) such that the outflow opening is obtained in the gas bag envelope of the gas bag. For example, the gas bag envelope is (locally) destroyed by the contact with the tool or there is merely opened a tear region provided in the gas bag envelope. The actuator cooperating with the tool is e.g. an elastic element or a mechanism including an elastic element (e.g. in the form of a pretensioned spring mechanism) or a pyrotechnical unit.

Alternatively or in addition to a mechanical generation of the outflow opening in the gas bag envelope, the pressure reducing device also can include a means for thermally acting on the gas bag envelope, e.g. a gas generating means (in particular in the form of a pyrotechnical unit) which upon activation of the pressure reducing device generates hot gases which act on the gas bag envelope. In particular, the gas generating means is a means separate from a gas generator for inflating the gas bag. The outflow opening generating means in particular is arranged on the vehicle; it is, however, also conceivable that the outflow opening generating means (e.g. a pyrotechnical unit for thermally generating an outflow opening) is arranged on the gas bag (in particular on its gas bag envelope).

It is also conceivable that the outflow opening of the gas bag is arranged such that on clearing the outflow opening the gas bag experiences a recoil which at least partly moves the gas bag out of the field of view of the driver.

It should be noted that different realizations of the pressure reducing device can also be used in combination with each other. It is possible, for example, to equip the gas bag arrangement both with a covering device for covering and clearing an outflow opening of the gas bag and with a coolant providing means. For example, it is also conceivable that the pressure reducing device is arranged in a region of the gas bag which after inflating the gas bag should be removed from the region of the windshield, in order to clear a field of view. For example, the pressure reducing device (in particular according to one of the embodiments described above) is arranged on the driver side (e.g. on a driver-side edge region of the gas bag). It is, however, also possible that the pressure reducing device is arranged on the passenger side (e.g. there likewise on an edge region of the gas bag) or both on the driver side and on the passenger side at least one pressure reducing device each is present, e.g. at least one outflow opening each. It is also possible that, when the gas bag should be retracted both on the driver side and on the passenger side, a pressure reducing device is provided approximately centrally (with respect to the transverse vehicle direction). The cross-section of the outflow opening to be opened or the amount of coolant injected possibly must be increased in this case.

As already mentioned above, the gas bag arrangement according to the invention also can include a means for moving at least one section of the at least partly inflated gas bag out of the field of view of a vehicle occupant of the vehicle. For example, this means at least partly moves the gas bag in direction of its starting position, in which it was before inflation, away from the field of view. It is also possible that the inflated gas bag is at least partly (e.g. also completely) detached from the vehicle by means of the means for moving.

The means for moving e.g. is formed to be self-controlling, so that the force exerted by the means onto the gas bag moves at least a section of the inflated gas bag out of the field of view of a vehicle occupant, as soon as the gas bag internal pressure falls below a specifiable value. In other words, for triggering purposes no electric control signal of a control means of the vehicle is transmitted to the means for moving, but the means directly (in particular mechanically) cooperates with the gas bag, so that when the gas bag internal pressure falls below a specifiable value, it automatically starts to move the gas bag out of the field of view. It is of course also possible that the means for moving is not designed to be self-controlling, but formed such that it can be activated via a control signal of a control means (in particular an ECU of the vehicle).

For example, the means for moving comprises at least one connecting element (e.g. in the form of a strap) which with a first portion is connected with the gas bag and with a second portion likewise is connected with the gas bag or connectable with the vehicle.

It is conceivable that the connecting element is at least partly formed elastic, i.e. in the form of an elastic element connected with the gas bag (e.g. an elastic catch strap). The elastic connecting element is arranged and formed e.g. such that after a specifiable time period after activation of the gas bag or in the case of a specifiable drop of the gas bag internal pressure after reaching a maximum pressure, it moves the inflated gas bag out of the field of view of the driver. The time period or the internal pressure after/at which the gas bag should be moved out of the field of view can be specified in particular via the dimensioning and/or the material of the elastic element, with the connecting element pulling the gas bag out of the field of view when the force acting on the elastic connecting element due to the internal pressure of the gas bag becomes smaller than the restoring force acting on the gas bag due to the elastic connecting element, as a result of the pressure reduction after triggering the pressure reducing device. For example, the connecting element is formed elastic such that upon deployment of the gas bag its length increases by at least 20% or by at least 30%.

The connecting element can at least partly extend outside the gas bag, wherein it is connected for example with an outside of the gas bag. It is, however, also possible that the connecting element at least partly extends inside the gas bag and for example is connected with an inside of the gas bag.

Furthermore, the means for moving can include restoring force generating means for generating a restoring force on the at least partly inflated gas bag, wherein the connecting element (e.g. itself formed non-elastic) is connected with the gas bag or connectable with the vehicle via the restoring force generating means. For example, the restoring force generating means comprise an elastic element or an elastically formed region (e.g. a region of a housing) of the gas bag arrangement.

It is also possible that the restoring force generating means include a spring cooperating with the connecting element, which is tensioned under the pull of the connecting element occurring during deployment of the gas bag, i.e. the connecting element can be pretensioned via the restoring force generating means. In one variant of the invention the restoring force generating means include a winding means (for example in the form of a winding spool) for winding up the connecting element, wherein the winding means cooperates with the spring formed as spiral spring via a shaft.

According to a further exemplary aspect of the gas bag arrangement according to the invention the gas bag includes a first and a second partial region, wherein the pressure reducing device is formed and arranged such that the pressure drop (e.g. in a certain time period) after activating the pressure reducing device is larger in a first partial region than in the second partial region.

It is conceivable that the internal pressure of the second partial region of the gas bag (in contrast to the internal pressure in the first partial region) is not changed substantially after activating the pressure reducing device. For example, the above-mentioned connecting element of the retracting means (e.g. formed in the form of an elastic strap) with its first portion (e.g. a first end) is connected with the first partial region of the gas bag and with its second portion (e.g. a second end) with the second partial region of the gas bag. It is possible that the pressure reducing device is positioned in the first partial region of the gas bag such that the distance between the pressure reducing device and the first end of the connecting element is smaller than the distance between the pressure reducing device and the second end of the connecting element. It is of course also conceivable that several connecting elements are provided, which each are connected with the first and the second partial region of the gas bag.

In addition, the first partial region of the inflated gas bag, with which the first end portion of the connecting element (or the first end portions of the connecting elements) is connected, extend in the viewing region of a vehicle occupant present on a front seat of the vehicle, e.g. along the windshield on the driver side. The second end portion of the connecting element, on the other hand, is connected with the second partial region of the gas bag, spaced from the first end portion (i.e. from the first partial region of the gas bag).

Since the internal pressure of the second partial region of the gas bag does not change at least substantially after activating the pressure reducing device, the second end portion of the connecting element connected with the second partial region also at least substantially maintains its position (relative to the vehicle), so that when the force acting on the (elastic) connecting element due to the internal pressure in the first partial region of the gas bag becomes smaller than the restoring force acting on the first partial region due to the connecting element as a result of the pressure reduction after triggering the pressure reducing device, the first partial region is moved away from its protective position and hence from the field of view in direction of the second partial region of the gas bag.

It is also possible that the connecting element (which in particular is formed as elastic element in the form of a catch strap) with one end portion or with both of its end portions is attached to the gas bag such that in the case of a drop of the gas bag internal pressure it moves at least a partial region of the gas bag at least approximately in transverse vehicle direction. For example, after inflating the gas bag the connecting element at least approximately extends in transverse vehicle direction.

The connecting element also can be coupled with an (inflatable) element (e.g. in the form of a tensioning hose) fillable with gas, which after activating the gas bag is filled with gas, so that the fillable element expands and the elastic or pretensionable element is tensioned. It is also conceivable that the gas bag arrangement includes means (e.g. a stage of a multistage gas generator) for filling the fillable element, which can be activated at a specifiable point in time after inflating the gas bag.

In another exemplary aspect of the invention the gas bag is connected with the vehicle via at least one first and one second (in particular pretensioned) connecting region, wherein the gas bag arrangement includes means for releasing the gas bag, which after a specifiable time period after activating the gas bag (i.e. the start of inflating the gas bag) or in the case of a specifiable drop of the gas bag internal pressure separate the connection of the gas bag with the vehicle via one of the connecting regions, so that due to the still existing pretension the gas bag moves over the other connecting region and/or due to the acting head wind out of the field of view of the driver.

For example, the second connecting region is connected with the vehicle (or another region of the gas bag) via an elastic connecting element (in particular in the form of a catch strap). The first connecting region is connected with the vehicle e.g. via a covering device (e.g. likewise in the form of a catch strap or an inflatable element as described above) for clearing an outflow opening (see above), wherein the covering device completely detaches from the gas bag after triggering the pressure reducing device and hence not only clears the outflow opening, but also the portion of the gas bag with the first connecting region and hence the field of view.

It is also conceivable that the connecting element at the same time acts as covering device of the pressure reducing device for covering and clearing an outflow opening (see above) or cooperates with such covering device. In addition, it should be noted that the means for moving the gas bag out of the field of view is not absolutely necessary. It is also conceivable that exclusively due to the decreasing internal pressure the gas bag at least partly moves out of the field of view (for example, the gas bag can at least partly collapse due to the gravitation).

BRIEF DESCRIPTION OF THE DRAWINGS

The invention will subsequently be explained in detail by means of exemplary embodiments with reference to the Figures.

DETAILED DESCRIPTION

Figure 1:
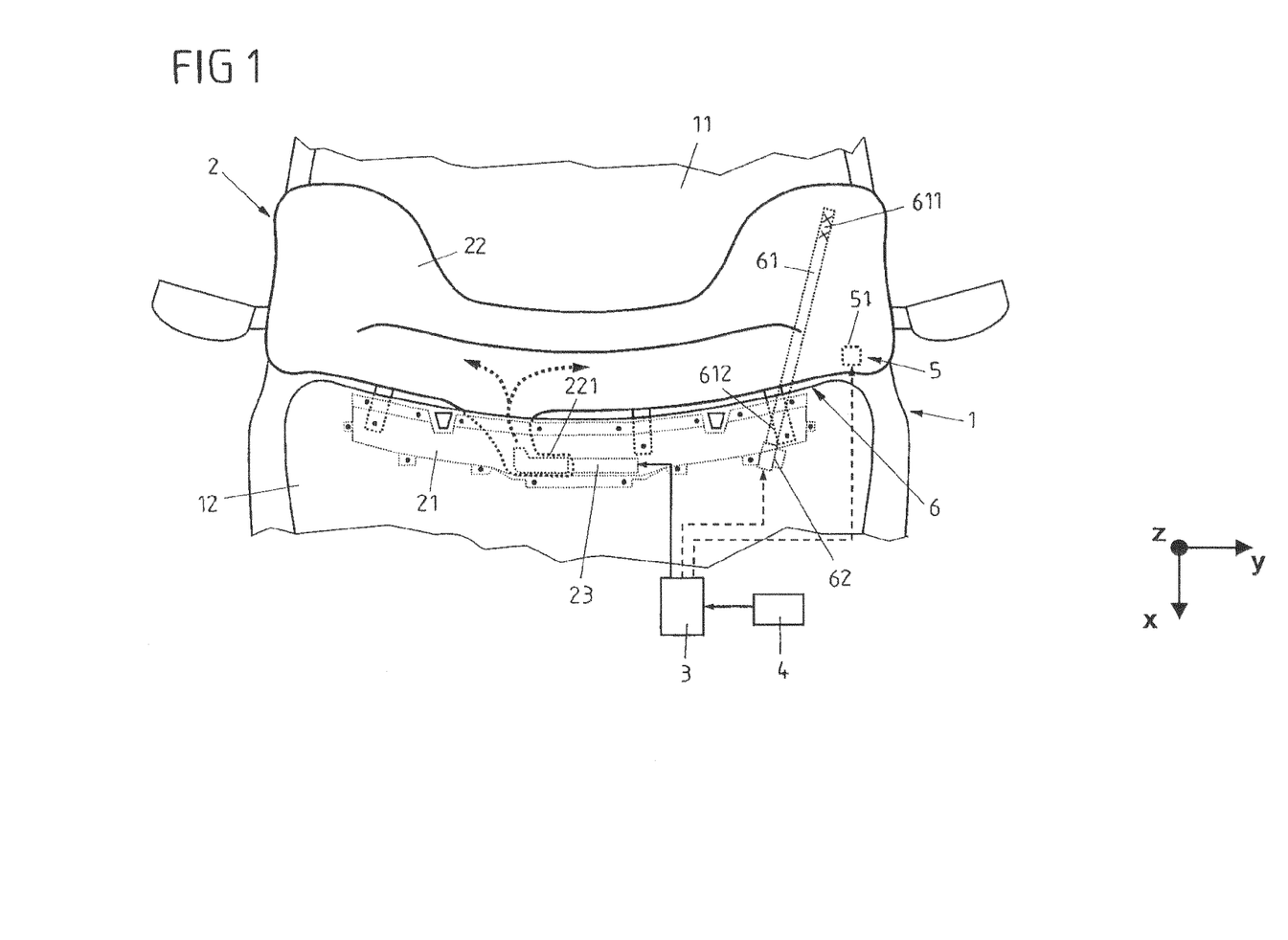
FIG. 1 shows a gas bag arrangement according to a first exemplary embodiment of the invention.

FIG. 1 shows a top view of a gas bag arrangement 2 according to the invention, which is arranged on a motor vehicle 1, after inflating the gas bag 22, so that the gas bag 22 covers a part of a windshield of 11 of the vehicle 1. The gas bag arrangement furthermore includes a gas bag module housing 21 arranged below a hood 12 of the vehicle 1, out of which housing the gas bag 22 has deployed in direction of the windshield 11. For inflating the gas bag 22, the gas bag arrangement 2 in addition includes a gas generator 23 located within the module housing 21, which protrudes into a blow-in region 221 of the gas bag 22.

Inflating the gas bag 22 via the gas generator 23 is effected in dependence on a control signal of an ECU 3, wherein parameters concerning the vehicle condition, which are detected by sensors 4, are processed by the ECU 3. If in the case of a directly imminent or already started collision with a person present outside the vehicle determined or stored threshold or limit values are exceeded, the ECU 3 generates a control signal for activating the gas generator 23, whereupon the gas bag 22 is inflated by the gases generated by the gas generator 23.

A region of the gas bag 22 protecting a person impacting on the vehicle (protective region of the gas bag, i.e. in particular that region of the gas bag which extends across the windshield 11 and a portion of the hood 12 facing the windshield 11 and the remaining front vehicle body) for example is located completely outside the engine compartment covered by the hood. The protective region of the gas bag 22 in particular covers the lower region of the windshield 11 and e.g. also regions of the two A-pillars of the vehicle adjacent to the windshield 11.

Furthermore, the gas bag arrangement 2 includes a means (retracting means 6) for moving the inflated gas bag out of the field of view of the vehicle operator. The retracting means 6 here is arranged on the driver side (alternatively or in addition also possible on the passenger side) and after the deployment of the gas bag 22 and the possible impact of a person should again provide for the forward view, especially for the vehicle operator.

The retracting means 6 can be designed to be self-controlling and/or be actuatable or activable via the ECU 3. For example, the retracting means 6 comprises a connecting element in the form of a retracting strap 61, which with a first end 611 is connected with the gas bag 22 (namely on its side facing the windshield 11). The second end 612 of the retracting strap 61 is coupled with restoring force generating means in the form of a retraction mechanism 62 (e.g. arranged in the module housing 21 or connected with the housing 21) and connected with the vehicle 1 via the retraction mechanism 62, The retraction mechanism 62 for example includes a winding spool cooperating with a spiral spring, as will yet be explained in detail with reference to FIG. 3. During deployment of the gas bag 22 a force is produced by the pressure building up in the gas bag interior, which force is transmitted to the winding spool via the retracting strap 61, so that the spiral spring is tensioned. The spiral spring is wound up in the process. If the gas bag internal pressure drops, the force transmitted to the winding spool is reduced, whereupon the spiral spring is unwound again (relaxes) and thereby withdraws the retracting strap 61 and hence the gas bag 22 from the field of view of the vehicle operator.

It is also conceivable that the retracting means 6 is designed such that it is triggered via a signal of the ECU 3. In this case, the retraction mechanism 62 includes e.g. an actuator which realizes the retracting operation. As actuator, an electric motor which drives the winding spool or a pyrotechnically driven piston-cylinder unit might be provided, for example.

In addition, the gas bag arrangement 2 includes a pressure reducing device 5 for reducing the internal pressure of the inflated gas bag 22. By lowering the gas bag internal pressure, moving the gas bag 22 out of the field of view of a vehicle occupant by means of the retracting means 6 is simplified and accelerated, since the retraction mechanism 6 must work against a lower gas bag internal pressure.

The pressure reducing device 5 is activated via a control signal of the ECU 3, e.g. at a certain point in time after the activation of the gas generator 23. It is, however, also conceivable that the pressure reducing device 5 (alternatively or in addition to the ECU control) is formed to be self-controlling (e.g. as self-adaptive outflow opening). The pressure reducing device 5 includes an outflow opening 51 of the gas bag 22, which before activating the pressure reducing device 5 is closed via a covering device (not shown in FIG. 1, cf. FIG. 4A-C). By activating the pressure reducing device 5, the covering device is moved relative to the outflow opening 51, so that the outflow opening 51 is cleared and gas can flow out of the gas bag 22 (arrow A in FIG. 2).

Figure 2:
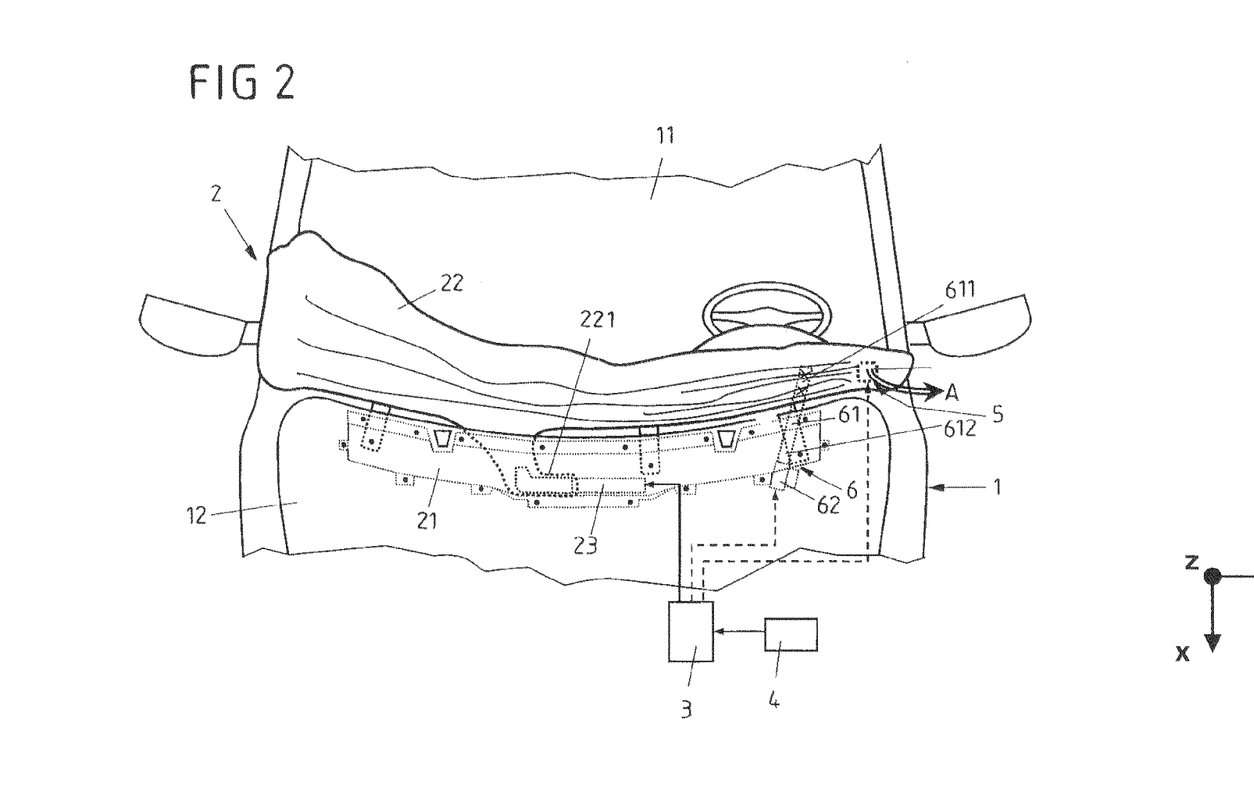
FIG. 2 shows the gas bag arrangement of FIG. 1 after triggering the pressure reducing device.

The condition of the gas bag 22 at the time after activating the pressure reducing device 5 is shown in FIG. 2. After falling below a specifiable internal pressure (in particular due to the design of the retraction mechanism 62), the gas bag 22 no longer is able to compensate the restoring force exerted by the retraction mechanism 62 onto the gas bag 22, so that the retraction mechanism 62 pulls the gas bag 22 (e.g. against the deployment direction) out of the field of view of the driver (i.e. the retraction mechanism 62 automatically becomes active on falling below the specifiable internal pressure).

Figure 3:
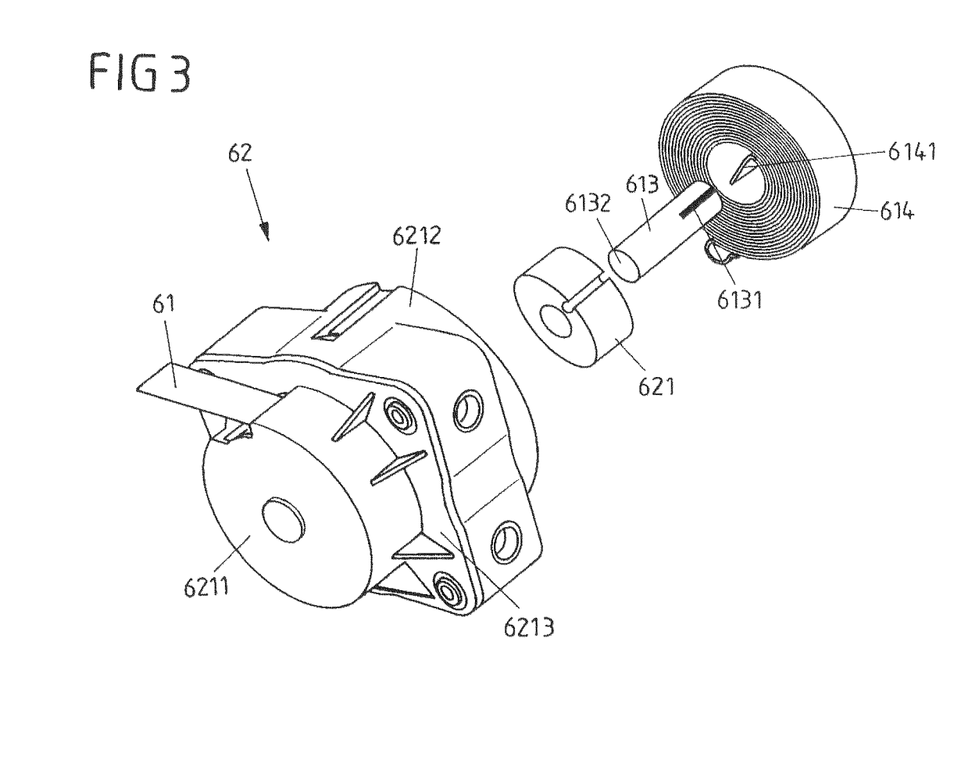
FIG. 3 shows a retraction mechanism of the gas bag arrangement of FIGS. 1 and 2 in an exploded representation.

FIG. 3 shows a detailed exploded representation of a variant of a retraction mechanism 62 of the retracting means 6 accommodated in a two-part housing. Accordingly, the retraction mechanism 62 includes a winding means in the form of a winding spool 621 arranged in a first housing part 6211, at which the second end 612 of the retracting strap 61 is fixed. The winding spool 621 cooperates with a spiral spring 614 via a shaft 613, wherein an inner end 6141 of the spiral spring 614 engages in an end region (slot 6131) of the shaft 613. The spiral spring 614 is accommodated in a second housing part 6212, wherein the second housing part 6212 is fixed at a flange region 6213 of the first housing part 6211.

With its other, opposite end 6132 the shaft 613 is non-rotatably connected with the winding spool 621. During deployment of the gas bag 22, the retracting strap 61 is unwound from the winding spool 621. Via the shaft 613, the resulting rotary movement of the winding spool 621 is passed on to the spiral spring 614 (to its inner end 6141), whereby the same is wound up and hence tensioned. With increasing unwinding length of the retracting strap 61, the restoring force exerted on the gas bag 22 thus is increasing.

Figure 4A:
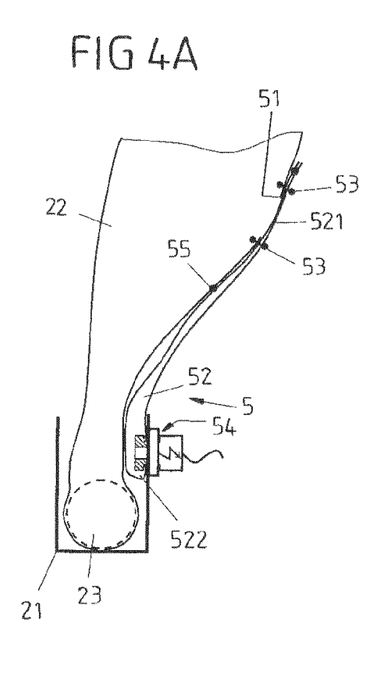
FIGS. 4A-C show a configuration of the pressure reducing device of the gas bag arrangement of FIGS. 1 and 2.
Figure 4B:
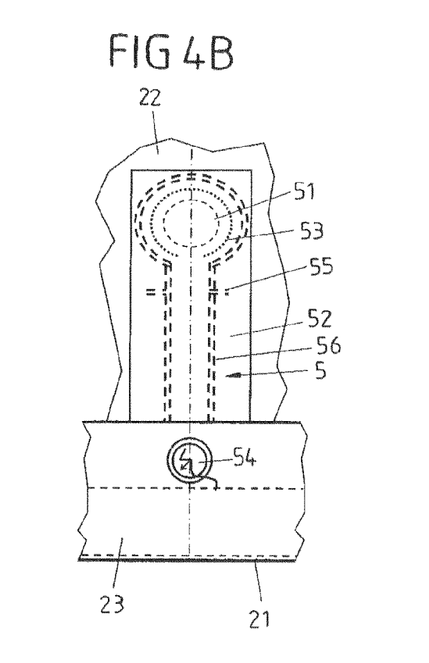
Figure 4C:
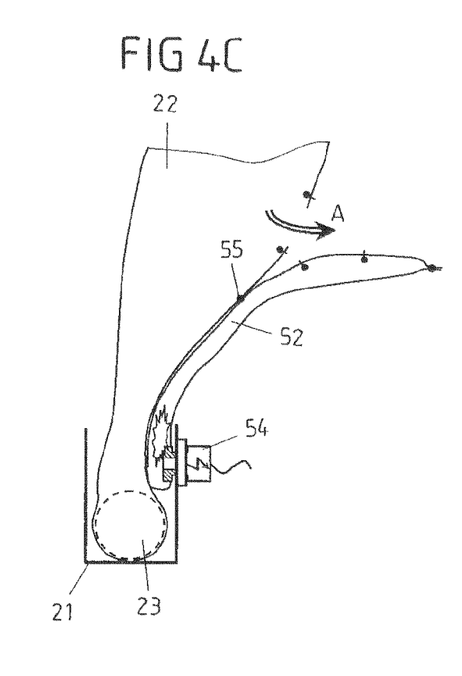

FIGS. 4A to 4B relate to a variant of the pressure reducing device 5, wherein FIGS. 4A and 4C show various sectional representations and FIG. 4B shows a top view of the pressure reducing device 5.

FIG. 4A and FIG. 4B represent the starting situation, i.e. the condition of the gas bag 22 and the pressure reducing device 5 before activation of the pressure reducing device 5. The gas bag 22, however, has already been filled with the gas released by the gas generator 23 after ignition thereof and has deployed out of the module housing 21 along the windshield.

The pressure reducing device 5 comprises an outflow opening 51 of the gas bag 22, which is closed by a portion (covering member 521) of a covering device in the form of an inflatable element 52 extending along the inflated gas bag 22 in a channel-like manner. Along the edge region of the gas bag 22 surrounding the outflow opening 51, the inflatable element 52 is connected with the gas bag 22 by means of at least one releasable connection 53 (e.g. in the form of at least one tear seam). For example, the connection 53 extends around the outflow opening 51. In addition, at least one firm connection 55 can be provided between the inflatable element 52 and the gas bag 22. With its end 522 facing away from the covering member 521 the inflatable element 52 is firmly mounted on the vehicle (e.g. on the module housing 21).

The pressure reducing device 5 furthermore includes a gas providing means in the form of an (in particular pyrotechnical) gas source 54 for inflating the inflatable element 52, which is different from the gas generator 23. The inflatable element correspondingly is arranged on the vehicle such that the gas source 54 is in flow connection with an inflatable volume of the inflatable element 52. The inflatable volume of the inflatable element 52 in particular is defined by two firmly connected (in particular opposed to each other) connecting regions of two material layers (e.g. of a gas bag material). The material layers in particular are connected with each other via a seam 56, wherein the seam 56, which with an upper portion likewise extends around the outflow opening 51, defines the inflatable volume of the inflatable element 52. Suitable configurations of the inflatable element are described in the German Patent Application DE 10 2010 039 895, to which reference is made in so far.

FIG. 4C shows the situation after activating the pressure reducing device 5, i.e. after triggering the gas source 54. The loading of the connections 53 caused by the action of the pressure building up in the inflatable element 52 by filling with gas of the gas source 54 and e.g. also by the high temperature of the inflowing gases finally leads to its destruction, so that the inflatable element 52 is moved away from the gas bag 22 at least in the region of the outflow opening 51 and thus clears the outflow opening 51. Thereupon, gas flows off from the interior of the gas bag 22 to the outside, which effects a reduction of the gas bag internal pressure.

According to FIG. 4C, the connection between the inflatable element 52 and the gas bag 22 via the additional firm connection 55 also is maintained after activating the gas source 54. It is, however, also conceivable that the connection 55 also is formed to be separable (in particular likewise as tear connection), so that the gas bag 22 is detached over a larger surface (e.g. completely from the inflatable element 52) (cf. also the exemplary embodiment of FIGS. 13A and 13B).

Figure 5:
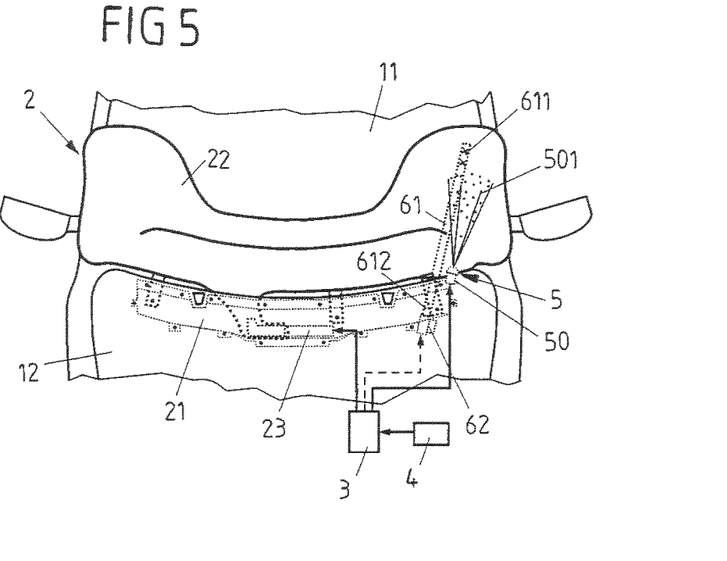
FIG. 5 shows a gas bag arrangement according to a second exemplary embodiment of the invention.

FIG. 5 represents a further exemplary embodiment of the gas bag arrangement according to the invention, which is designed similar to the first exemplary embodiment. However, the pressure reducing device 5 here is not formed by a combination of an outflow opening and a covering device, but the pressure reducing device includes a coolant providing means in the form of a cooling device 50, wherein after activation the cooling device 50 injects a coolant 501 into the inflated gas bag 22. For example, the cooling device 50 has a cooling outlet region protruding through an opening into the gas bag 22. By the coolant 501 injected into the gas bag 22, the temperature of the gases present in the gas bag 22 and hence the gas bag internal pressure is lowered abruptly.

The cooling device 50 is controlled separately via the ECU 3, i.e. triggered in response to a control signal of the ECU 3, as already explained above in conjunction with the first exemplary embodiment.

Figure 6:
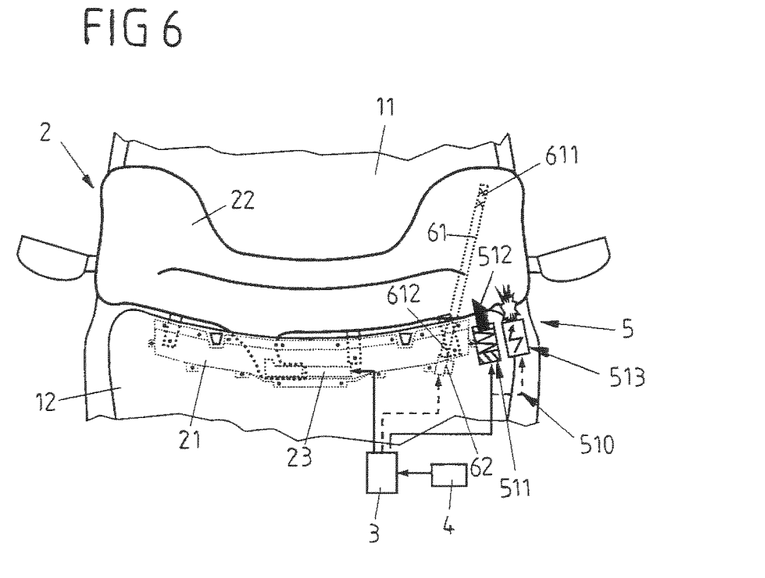
FIG. 6 shows a gas bag arrangement according to a third exemplary embodiment of the invention.

FIG. 6 relates to a further exemplary embodiment of the gas bag arrangement, which differs from the previous examples only by the design of the pressure reducing device 5. Accordingly, the pressure reducing device 5 comprises an outflow opening generating means 510, which comprises a tool in the manner of a blade 512 cooperating with an actuator in the form of a spring 511 and/or a pyrotechnical unit 513. After activating the outflow opening generating means 510, the blade 512 is brought in mechanical contact with the gas bag 22 (the gas bag envelope) by relaxing the spring 511, whereby the gas bag envelope is locally undone and in this way an outflow opening is generated in the gas bag. After activating the outflow opening generating means 510, the pyrotechnical unit 513 furthermore releases hot gases which act on the gas bag envelope of the gas bag 22, whereby an outflow opening likewise is generated in the gas bag.

The spring-blade combination 511, 512 or the pyrotechnical unit 513 are actuated via the ECU 3, as explained above in conjunction with the other exemplary embodiments. The spring-blade combination 511, 512 or the pyrotechnical unit 513 can both be firmly arranged on the vehicle and on the gas bag 22 (e.g. on its gas bag envelope). Of course, it is also possible to use only the spring-blade combination 511, 512 or only the pyrotechnical unit 513.

It should be mentioned that the pressure reducing means of FIGS. 4A-C, 5 and 6 can of course also be used in combination with each other.

FIGS. 7 to 15 relate to different configurations of the retracting means 6 of the gas bag arrangement 2 according to the invention (each schematically shown in a sectional view), wherein the illustrated gas bag arrangements in particular each also include a pressure reducing means, even if the same is not shown in each of FIGS. 7 to 15.

Figure 7:
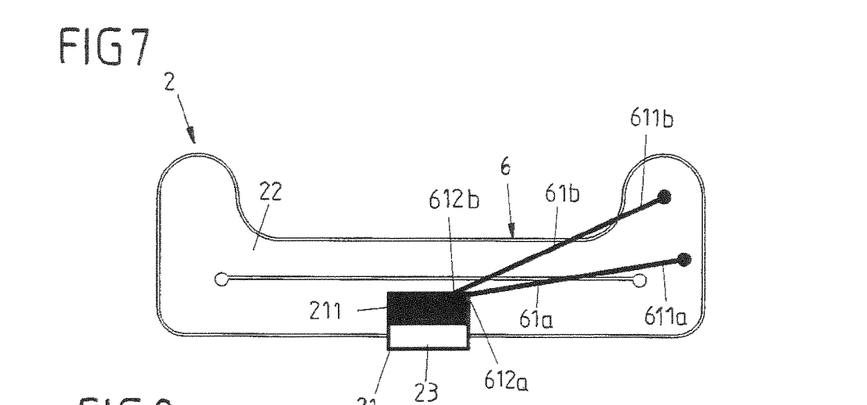
FIG. 7 shows a gas bag arrangement according to a fourth exemplary embodiment of the invention.

According to FIG. 7, the retracting means 6 comprises two (e.g. elastic) retracting straps 61a, 61b which with one end 611a, 611b each are connected with the gas bag 22 (in particular on the driver side). The respective other end 612a, 612b is fixed on an elastically formed region 211 of the gas bag module housing 21, wherein the region 211 is e.g. a module cap of the module housing 21, which faces a cover, e.g. a hood, of the vehicle. Of course it is possible to also use only one retracting strap or more than two retracting straps. It is also conceivable that the ends 612a, 612b of the retracting straps 61a, 61b each are fixed on another elastic portion or element of the gas bag arrangement, e.g. on an element elastically mounted in a hinge region.

Upon deployment of the gas bag 22, the retracting straps 61a, 61b are stretched and contract after decrease of the gas bag internal pressure, wherein they carry along part of the gas bag 22 and move the same out of the field of view of the driver, as already explained above in principle.

Figure 8:
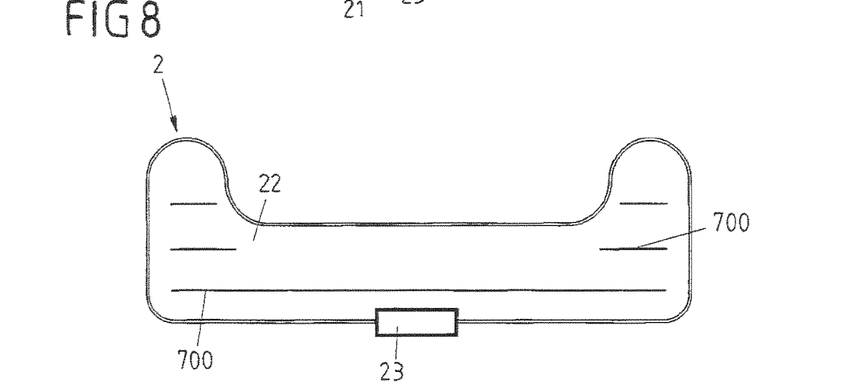
FIG. 8 shows a gas bag arrangement according to a fifth exemplary embodiment of the invention.

FIG. 8 illustrates that the gas bag 22 can be provided with seams in the form of darts 700, which in particular connect two gas bag layers of the gas bag 22 with each other. In particular via the position, the number and the extension of the darts 700 a specific shape can be provided to the gas bag 22, which it takes after deployment and the subsequent decrease in pressure.

Figure 9:
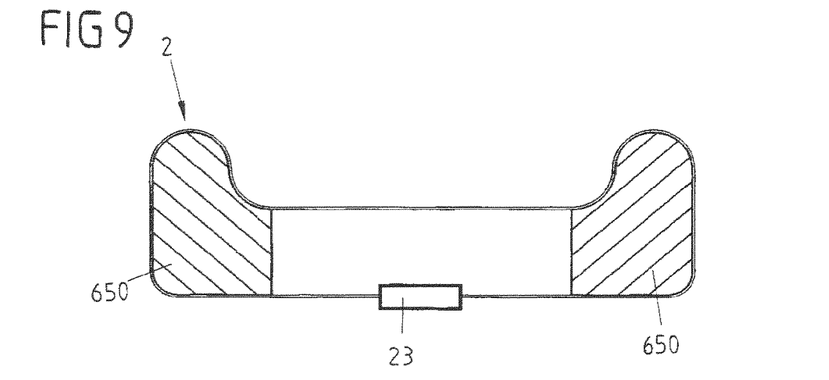
FIG. 9 shows a gas bag arrangement according to a sixth exemplary embodiment of the invention.

According to FIG. 9, certain regions 650 of the gas bag 22 are provided with a thermally activable material capable of contraction (e.g. in the form of a fabric) or consist of the same. A specific shape also can be imposed on the gas bag by means of the thermally activable regions 650, which it should take after deployment and subsequent decrease in pressure.

Figure 10:
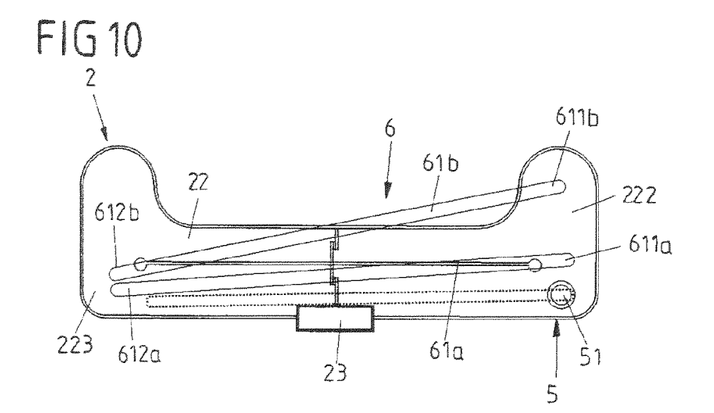
FIG. 10 shows a gas bag arrangement according to a seventh exemplary embodiment of the invention.

The design of the retracting means 6 as shown in FIG. 10 comprises two retracting straps 61a, 61b, which each are fixed on the gas bag 22 with their first and second ends 611a, 611b, 612a, 612b, wherein the retracting straps 61a, 61b extend almost across the entire width (measured in transverse vehicle direction) of the gas bag 22. For example, the gas bag 22 includes a first partial region 222 extending on the driver side, with which the first ends 611a, 611b of the retracting straps 61a, 61b are connected.

The second ends 612a, 612b are connected with a second partial region 223 extending on the passenger side, whose internal pressure, in contrast to the internal pressure in the first partial region 222, at least substantially cannot be lowered by means of the pressure reducing device 5. Thus, the second partial region 223 remains in position even after activating the pressure reducing device 5, so that the first ends 611a, 611b of the retracting straps 61a, 61b and hence the first partial region 222 of the gas bag 22 are pulled in direction of the second ends 612a, 612b of the retracting straps 61a, 61b and the first partial region 222 thus is moved out of the viewing region of the driver. For example, the retracting straps 61a, 61b effect folding down of the driver-side first region 222 of the gas bag 22.

The pressure reducing device 5 of the gas bag 22 shown in FIG. 10 in addition comprises an outflow opening 51 which is positioned in the first partial region 222 of the gas bag 22, i.e. the distance of the outflow opening 51 to the first ends 611a, 611b of the retracting straps 61a, 61b is smaller than to the second ends 612a, 612b of the retracting straps 61a, 61b. For example—as explained above—the outflow opening 51 is cleared actively via an ECU or can also be of the passive type, wherein clearing can be effected e.g. in dependence on the degree of deployment of the gas bag. It is also conceivable that one of the retracting straps 61a, 61b initially closes the outflow opening 51 and clears the same upon complete deployment of the gas bag 22.

Figure 11:
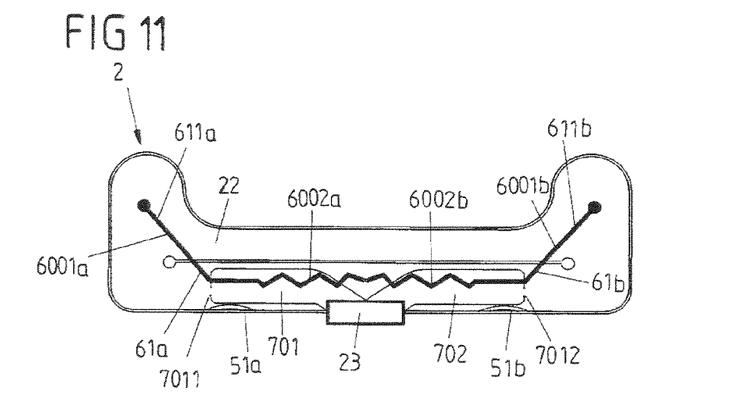
FIG. 11 shows a gas bag arrangement according to an eighth exemplary embodiment of the invention.

According to FIG. 11, the retracting means 6 of the gas bag arrangement 2 in turn includes two retracting straps 61a, 61b, which are fixed at the gas bag 22 with one end 611a, 611b each. In addition, two tensioning hoses 701, 702 are arranged in the interior of the gas bag 22, namely such that with one end each they are directly connected with an outflow region of the gas generator 23, so that gas of the gas generator can flow into the gas bag 22 via the tensioning hoses 701, 702 (and an outflow opening 7011, 7012 each provided e.g. in an end facing away from the gas generator 23). Furthermore, after deployment of the gas bag 22 the tensioning hoses 701, 702 initially cover two outflow openings 51a, 51b of the gas bag 22.

The retracting straps 61a, 61b each include a first (e.g. non-elastic) portion 6001a, 6001b and a second, elastic portion 6002a, 6002b, which extend in the interior of the tensioning hoses 701, 702 and are connected (e.g. sewn) to the respective tensioning hose 701, 702. Upon deployment of the gas bag 22, the tensioning hoses 701, 702 and hence the second portions 6002a, 6002b of the retracting straps 61a, 61b are stretched. At the same time, the tensioning hoses 701, 702 cover the outflow openings 51a, 51b.

When the pressure in the gas bag 22 is decreased, the second, elastic portion 6002a, 6002b of the retracting straps 61a, 61b contracts the tensioning hoses 701, 702, so that the outflow openings 51a, 51b are cleared again, whereby the pressure decrease in the gas bag 22 is accelerated. Via the first portions 6001a, 6001b of the retracting straps 61a, 61b the gas bag 22 at the same time is at least partly displaced (in particular out of the viewing region of the driver). It is also conceivable that the retracting straps 61a, 61b are integrally connected with each other.

Figure 12:
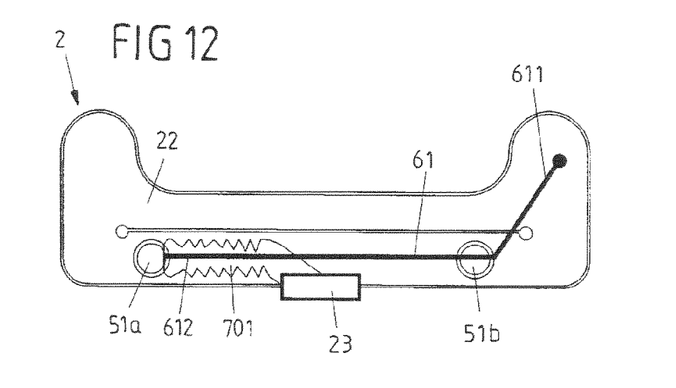
FIG. 12 shows a gas bag arrangement according to a ninth exemplary embodiment of the invention.

In the exemplary embodiment of FIG. 12, only one (in particular non-elastic) retracting strap 61 is present, with its one end 611 in turn being connected with the gas bag 22. The retracting strap 61 in addition is guided through a tensioning hose 701 arranged in the gas bag interior and connected with the same via its other end 612.

In addition, the gas generator 23 includes two stages which are activable one after the other. The first stage of the gas generator serves for inflating the gas bag 22, in order to bring the same into its protective position. The second stage serves for filling the tensioning hose 701 which correspondingly is arranged relative to the gas generator 23 such that it can be filled with gas of the second stage of the gas generator 23. By filling the tensioning hose 701, the same is stretched and hence tensions the retracting strap 61 connected with the same such that the partial region of the gas bag 22 connected with the end 611 of the retracting strap 61 is removed from the field of view of a vehicle occupant.

In addition, the gas bag 22 can include outflow openings 51a, 51b which cooperate with the tensioning hose 701 and/or the retracting strap 61 such that they are initially closed and are cleared after igniting the second gas generator stage. For example, the outflow openings 51a, 51b each are closed with a covering device (e.g. a closure element in the form of a material piece), with the covering device being connected with the tensioning hose 701 and/or the retracting strap 61 such that on tensioning the tensioning hose 701 and/or the retracting strap 61 the covering device is moved away from the respectively associated outflow opening 51a, 51b. For example, the covering device initially each is attached to the gas bag 22 and is detached from the gas bag 22 under the influence of the tensioned tensioning hose 701 or retracting strap 61.

Figure 13A:
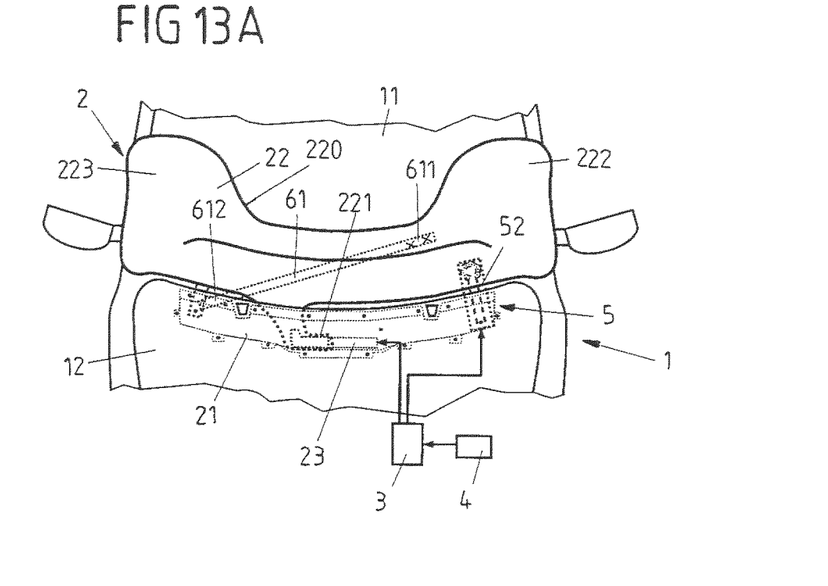
FIG. 13A shows a gas bag arrangement according to a tenth exemplary embodiment of the invention.
Figure 13B:
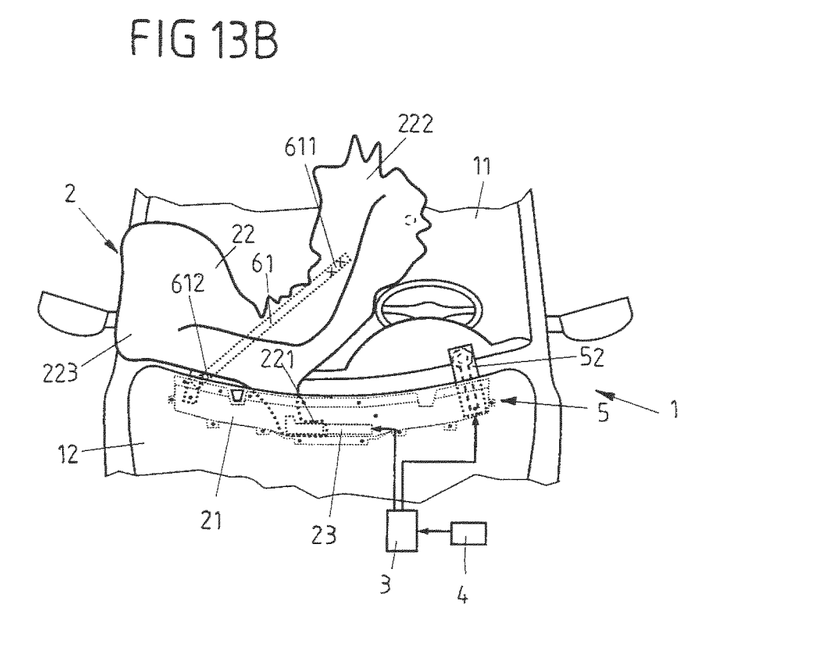
FIG. 13B shows the gas bag arrangement of FIG. 13A after activating the pressure reducing device.

FIGS. 13A and 13B relate to a further exemplary embodiment of the invention, wherein the gas bag arrangement 1 similar to the exemplary embodiment of FIGS. 4A and 4C includes a pressure reducing device 5 with an inflatable element 52, which with a first end portion is connected with a driver-side (first) region 222 of the gas bag 22 and with a second end portion is connected with the vehicle (e.g. via the module housing 21). Before activating the pressure reducing device 5, the inflatable element 52 covers an outflow opening of the gas bag 22, but is detached after activating the pressure reducing device 5, so that the outflow opening is cleared, as described in conjunction with FIGS. 4A to 4C.

In contrast to FIGS. 4A to 4C, the gas bag 22 (in the region of its first region 222) however is completely detached from the inflatable element 52 after activating the pressure reducing device 5. Under the influence of an (in particular elastic) retracting strap 61, which with a first end 611 is connected with the driver-side region 222 of the gas bag 22 and with a second end 612 on the passenger side is connected with the vehicle, the driver-side region 222 of the gas bag 22 thereby moves out of the field of view of the driver (FIG. 13B). In particular, the detached driver-side region 222 of the gas bag 22 swivels about a point at which the gas bag 22 is connected with the vehicle, e.g. about a connecting point at which an inflation orifice of the gas bag 22 is connected with the vehicle 1 or with a part (e.g. the gas generator) firmly connected with the vehicle.

The swivel movement of the driver-side region 222 of the gas bag 22 can be supported in that in its middle region, i.e. between its first and its second region 222, 223, the gas bag 22 has an indentation 220, i.e. a region in which the height extension of the gas bag 22 is reduced as compared to the first and second regions 222, 223. In particular, the regions of the gas bag 22 extending laterally beside the indentation 220 are formed such that they each cover a part of the A-pillar of the vehicle.

The swivel movement of the gas bag 22 out of the field of view of the driver can of course alternatively or additionally be generated by another, previously described retracting means (e.g. as shown in FIG. 7 or 10 to 12). It is also conceivable that the swivel movement of the gas bag 22 exclusively is caused by a recoil on the gas bag, which is due to the outflow of gas from the cleared outflow opening and/or is caused by the head wind. Furthermore, instead of an inflatable element 52 another covering device (e.g. a catch strap) can be used.

Figure 14:
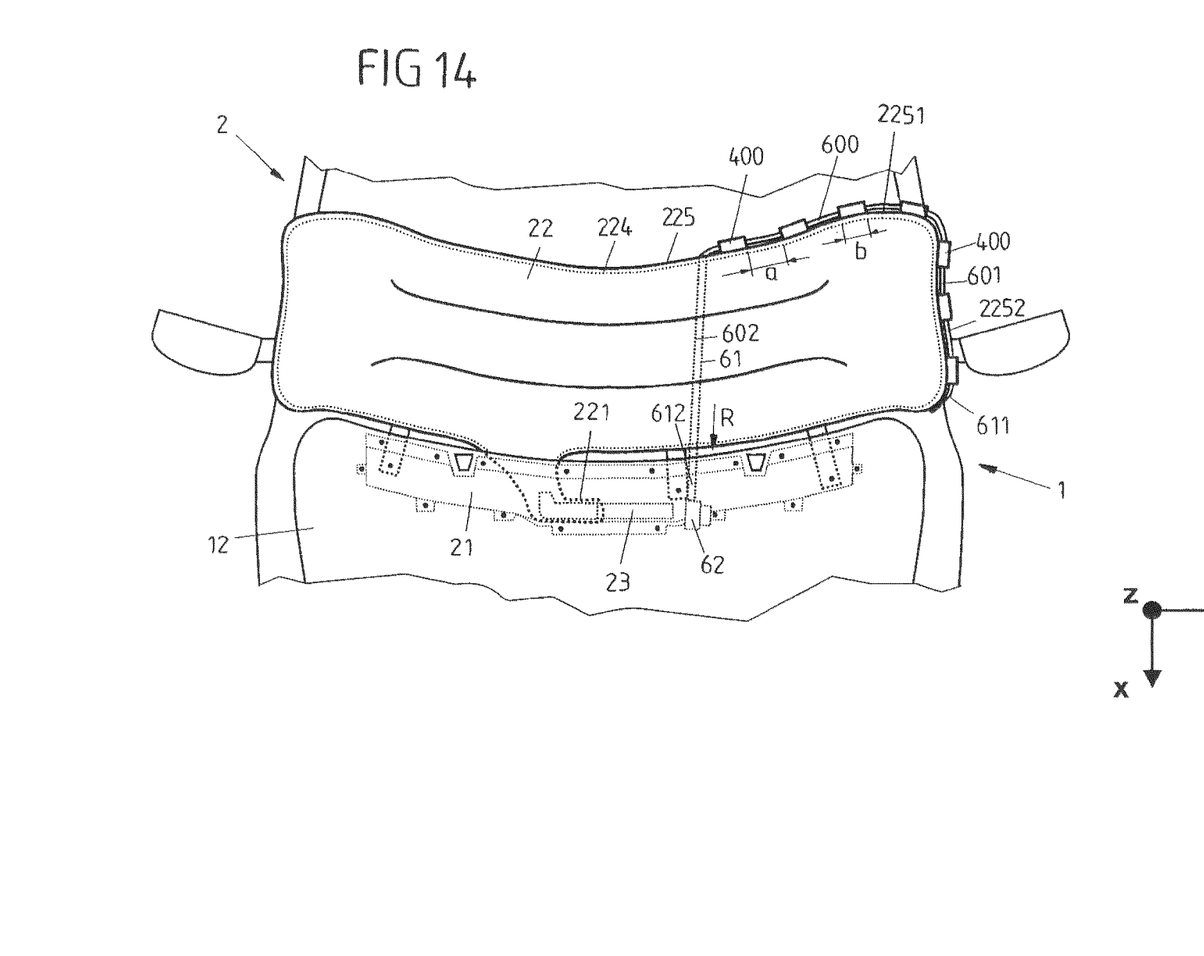
FIG. 14 shows a gas bag arrangement according to a tenth exemplary embodiment of the invention

FIG. 14 relates to a further configuration of the connecting element designed as retracting strap 61. Like in FIG. 1, the second end 612 of the retracting strap 61 is connected with the vehicle via the retraction mechanism 62. In contrast to FIG. 1, however, the first end 611 of the retracting strap 61 is not fixed on a (flat) side of the gas bag 22 extending parallel to the windshield 11.

Rather, a part of the retracting strap 61 extends along an outer edge 225 (i.e. along a peripheral seam 224) of the gas bag 22, wherein a section 600 of the retracting strap 61 extends along an upper portion 2251 of the gas bag edge 225 and another section 601 of the retracting strap 61 extends along a lateral portion 2252 of the gas bag edge 225. The upper portion 2251 of the gas bag edge 225 is that one of the two edge portions of the gas bag 22 extending parallel to a plane defined by the transverse vehicle direction and the vehicle height direction, which is furthest away from the hood 12. The lateral portion 2252 extends in the region of the driver side of the vehicle and in particular extends parallel to a plane defined by the longitudinal vehicle direction and the vehicle height direction and extending through the A-pillar of the vehicle.

The (first) end 611 of the retracting strap 61 adjoining the section 601 is fixed at the gas bag 22 in its lateral edge portion 2252 or at a lower edge portion of the gas bag 22. A portion 602 of the retracting strap 61 extending between the retraction mechanism 62 and the section 600 of the retracting strap 61 extends in a middle region of the gas bag 22 relative to the transverse vehicle direction and substantially transversely to the extension of the gas bag 22 in transverse vehicle direction, wherein the section 600 of the retracting strap 61 adjoins the portion 602 at an angle (or curved); for example, the sections 600 and 602 extend almost vertically to each other.

The portions 600, 601 of the retracting strap 61 extending along the edge portions 2251, 2252 of the gas bag 22 are guided by means of a guiding device formed of a plurality of loops 400. The loops 400 are arranged at a distance to each other, wherein they have e.g. a constant distance a from each other. For example, the distance a is 50 to 100 mm, in particular about 75 mm. The width b of the loops is e.g. not more than 30 mm, e.g. between 10 and 30 mm, in particular about 25 mm, wherein in particular between 10 and 20 loops are provided. It is of course not absolutely necessary that the loops 400 are arranged at constant distances to each other. In addition, it is also possible that the loops 400 have not identical, but different widths.

In particular, the width of the loops is dimensioned such that when hauling in (retracting) the retracting strap 61 (in retracting direction R) they are moved towards each other, e.g. until they rest against each other, so that the gas bag 22 is pleated, i.e. the gas bag regions located between the loops 400 are gathered, and the gas bag 22 thus is removed from the viewing region of the vehicle operator as efficiently as possible. The length of the retracting strap 61 (in particular the length of the portion of the retracting strap 61 to be retracted by the retraction mechanism 62) as well as the distance a and/or the width b of the loops 400 to each other are adjusted to the desired end position of the gas bag 22 after retraction.

Figure 15:
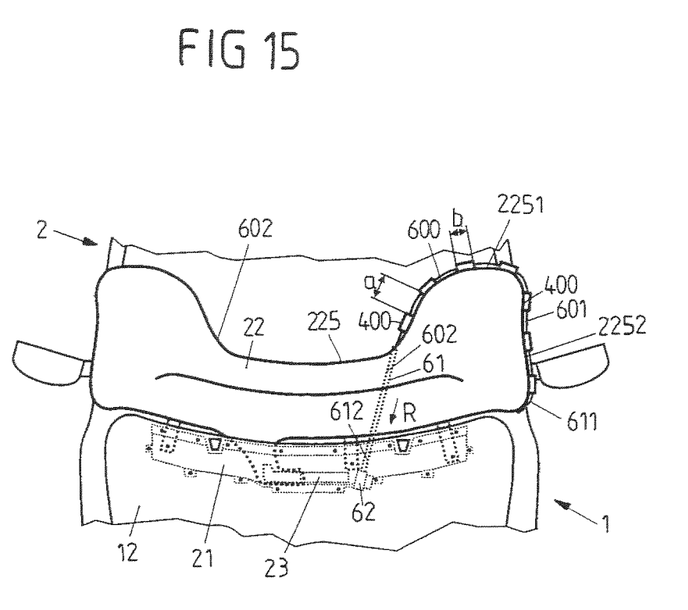
FIG. 15 shows a modification of the exemplary embodiment of FIG. 14.

FIG. 15 shows a modification of FIG. 14, according to which the gas bag 22 in the inflated condition has a middle indentation 220 with respect to the transverse vehicle direction.

As already indicated above, elements of the described exemplary embodiments can of course also be used in combination with each other. For example, the configuration of the retracting strap of FIGS. 14 and 15 can be combined with the other exemplary embodiments.

The invention claimed is:

1. A gas bag arrangement for a motor vehicle, comprising: a gas bag which can be deployed for the protection of a person present outside the motor vehicle along at least a section of the outside of the windshield or another portion of an outside of the motor vehicle; at least one pressure reducing device for reducing the internal pressure at least of a partial region of the at least partly inflated gas bag; and a means for moving at least a section of the at least partly inflated gas bag out of the field of view of a vehicle occupant of the vehicle, wherein the pressure reducing device can be activated at a specifiable point in time via a control means of the vehicle, wherein the means for moving is formed to be self-controlling, so that it exerts a force on the gas bag which moves at least a section of the inflated gas bag out of the field of view of a vehicle occupant, as soon as the gas bag internal pressure falls below a specifiable value.

2. A gas bag arrangement for a motor vehicle, comprising:
   a gas bag which can be deployed for the protection of a person present outside the motor vehicle along at least a section of the outside of the windshield or another portion of an outside of the motor vehicle;
   at least one pressure reducing device for reducing the internal pressure at least of a partial region of the at least partly inflated gas bag; and
   a means for moving at least a section of the at least partly inflated gas bag out of the field of view of a vehicle occupant of the vehicle,
   wherein the means for moving is formed to be self-controlling, so that it exerts a force on the gas bag which moves at least a section of the inflated gas bag out of the field of view of a vehicle occupant, as soon as the gas bag internal pressure falls below a specifiable value.

* * * * *